United States Patent
Okuma et al.

(10) Patent No.: US 11,062,159 B2
(45) Date of Patent: Jul. 13, 2021

(54) EMOTION ESTIMATION APPARATUS (71) Applicant: HONDA MOTOR CO., LTD., Tokyo (JP)

(72) Inventors: Kenji Okuma, Wako (JP); Takashi Okada, Wako (JP); Kota Saito, Wako (JP); Seungho Choi, Wako (JP); Yoshikazu Matsuo, Wako (JP); Naoki Kikuchi, Wako (JP); Katsuya Ikenobu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/665,491

(22) Filed: Oct. 28, 2019

(65) Prior Publication Data
US 2020/0134337 A1    Apr. 30, 2020

(30) Foreign Application Priority Data

Oct. 30, 2018  (JP) .............................. JP2018-203563

(51) Int. Cl.
G06K 9/00           (2006.01)

(52) U.S. Cl.
CPC ..... *G06K 9/00845* (2013.01); *G06K 9/00825* (2013.01)

(58) Field of Classification Search
CPC ................. B60W 40/09; B60W 10/00; G05D 2201/0213; G06N 3/004; G06K 9/00845; G06K 9/00825
See application file for complete search history.

(56) References Cited

U.S. PATENT DOCUMENTS

| 7,389,178 | B2 * | 6/2008 | Raz | G07C 5/085 |
| | | | | 340/903 |
| 10,035,514 | B1 * | 7/2018 | Lambert | B60W 40/09 |
| 10,315,665 | B2 * | 6/2019 | Halder | B60W 10/20 |
| 10,446,047 | B1 * | 10/2019 | Fields | G09B 19/167 |
| 10,475,127 | B1 * | 11/2019 | Potter | G08B 25/00 |
| 10,529,046 | B1 * | 1/2020 | Irey | G07C 5/0808 |
| 2008/0096533 | A1 * | 4/2008 | Manfredi | G06N 3/006 |
| | | | | 455/412.1 |

(Continued)

FOREIGN PATENT DOCUMENTS

JP       2016-071577 A    5/2016

OTHER PUBLICATIONS

NPL Google Search; 2020 (Year: 2020).*

(Continued)

*Primary Examiner* — Luis Perez-Fuentes
(74) *Attorney, Agent, or Firm* — Carrier Blackman & Associates, P.C.; Joseph P. Carrier; Anne G. Sabourin (57) ABSTRACT

An emotion estimation apparatus includes a recording section that records one or more events that cause a change in an emotion of a person and prediction information for predicting, for each event, an occurrence of the event; an event predicting section that predicts the occurrence of the event, based on detection of the prediction information; and a frequency setting section that sets a frequency with which an estimation of the emotion is performed. If the occurrence of the event is predicted by the event predicting section, the frequency setting section sets the frequency to be higher than in a case where the occurrence of the event is not predicted, and also sets the frequency based on the content of the event.

7 Claims, 8 Drawing Sheets (56) References Cited

U.S. PATENT DOCUMENTS

| | | | |
|---|---|---|---|
| 2008/0120025 A1* | 5/2008 | Naitou | G01C 21/12 |
| | | | 701/33.7 |
| 2011/0004577 A1* | 1/2011 | Jung | G06N 3/004 |
| | | | 706/12 |
| 2018/0204570 A1* | 7/2018 | Puranik | B60K 37/06 |
| 2018/0308569 A1* | 10/2018 | Luellen | G16H 40/20 |
| 2020/0134337 A1* | 4/2020 | Okuma | G06K 9/00845 |

OTHER PUBLICATIONS

Multimodal Emotion Recognition from Expressive Faces, Gestures and Speech; Lambert; 2007. (Year: 2007).*
A Critical Review of Proactive Detection of Driver Stress; Set-2018. (Year: 2018).*

\* cited by examiner

EMOTION ESTIMATION APPARATUS

CROSS-REFERENCE TO RELATED APPLICATION

This application is based upon and claims the benefit of priority from Japanese Patent Application No. 2018-203563 filed on Oct. 30, 2018, the contents of which are incorporated herein by reference.

BACKGROUND OF THE INVENTION

Field of the Invention

The present invention relates to an emotion estimation apparatus that estimates an emotion of a person.

Description of the Related Art

Emotion estimation apparatuses that estimate the emotion of a person are being developed in various fields. Japanese Laid-Open Patent Publication No. 2016-071577 discloses an apparatus that captures an image of the face of a driver with a camera and determines whether the driver is in a careless state based on the number of changes of his or her expression (changes of prescribed locations of the face) within a prescribed period (e.g. within three minutes).

SUMMARY OF THE INVENTION

If the frequency of the emotion estimation is high, the accuracy of the comprehension of the emotion of the person can be made high, but this also results in a large computational load.

The present invention takes the above problem into consideration, and it is an object of the present invention to provide an emotion estimation apparatus that can suitably comprehend the emotion of a person while also restricting an increase in the computational load.

An aspect of the present invention is an emotion estimation apparatus comprising a recording section configured to record prediction information for, for each event that causes a change in an emotion of a person, predicting an occurrence of the event; an event predicting section configured to predict the occurrence of the event, based on detection of the prediction information; and a frequency setting section configured to set a frequency with which an estimation of the emotion is performed, wherein if the occurrence of the event is predicted by the event predicting section, the frequency setting section sets the frequency to be higher than in a case where the occurrence of the event is not predicted, and also sets the frequency based on content of the event.

According to the present invention, it is possible to suitably comprehend the emotion of a person while also restricting an increase in the computational load.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes detailed examples of preferred embodiments of an emotion estimation apparatus according to the present embodiment, while referencing the accompanying drawings.

In each embodiment described below, it is assumed that the emotion estimation apparatus is provided in a vehicle. In each embodiment, the target of the emotion estimation may be a specific person sitting at a prescribed position in the vehicle, or may be all people in the vehicle. In the following description, it is assumed that the emotion estimation is performed on the person sitting in the driver's seat (the driver).

The emotion estimation apparatus performs an emotion estimation of a person with a set frequency. The emotion of a person changes after an event occurs. Therefore, the emotion estimation apparatus predicts the presence or lack of an occurrence of an event by detecting the presence or lack of another event (referred to below as a preceding event) that has a high possibility of occurring before the event occurs, and when it is predicted that the event will occur, sets the frequency to be higher than in a case where it is predicted that the event will not occur.

1. First Embodiment

The following describes an emotion estimation apparatus 10 according to a first embodiment. In the first embodiment, a person talking to another person in the vehicle (a conversation between a person and another person) is imagined as the event that causes a change in the emotion of the person.

[1.1. Configuration]

Figure 1:
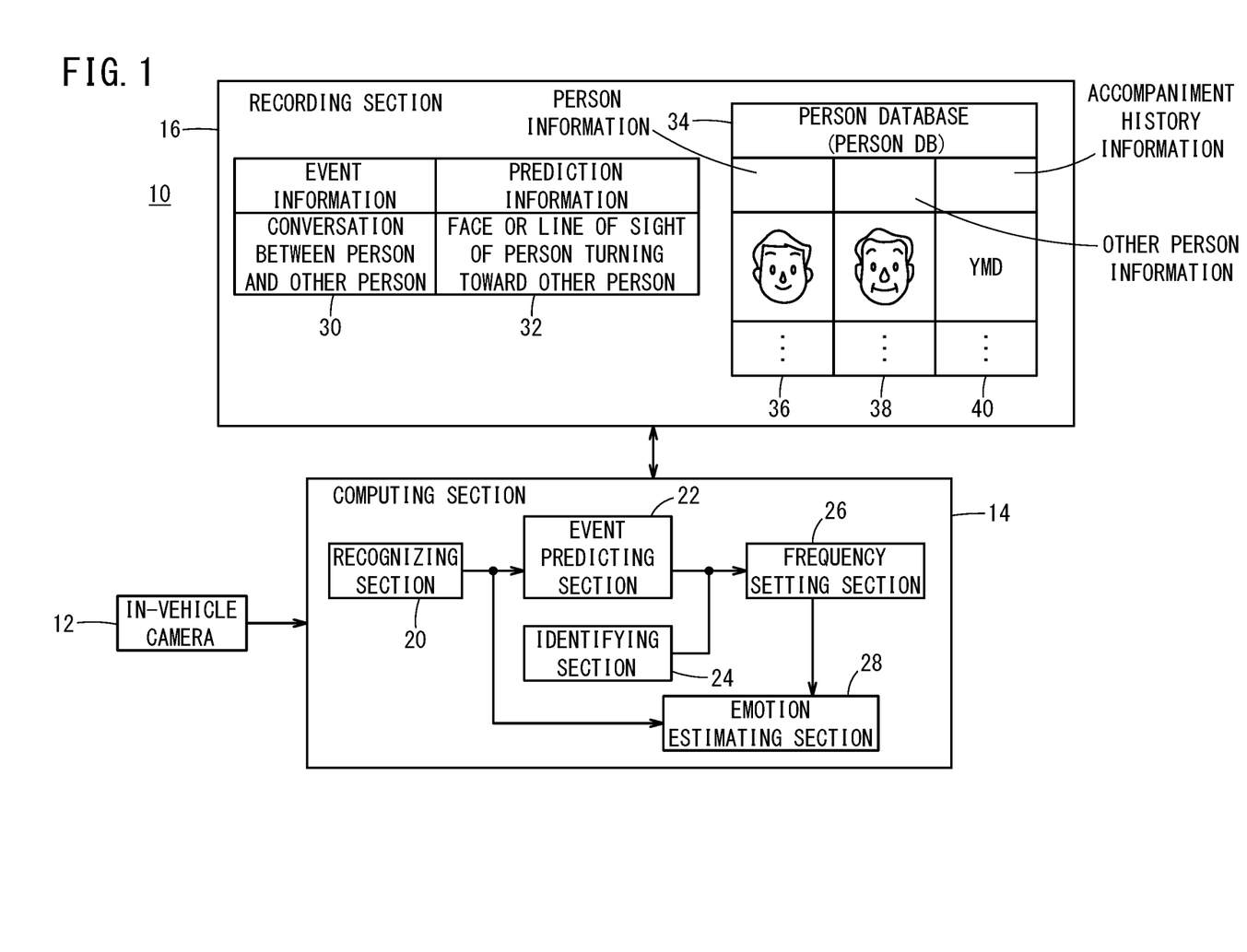
FIG. 1 is a block diagram of an emotion estimation apparatus according to a first embodiment.

The configuration of the emotion estimation apparatus 10 according to the first embodiment is described using FIG. 1. The emotion estimation apparatus 10 includes an in-vehicle camera 12, a computing section 14, and a recording section 16.

The in-vehicle camera 12 may be provided at a position enabling image capturing of each seat, such as the dashboard or the ceiling in the vehicle, or the in-vehicle camera 12 may be provided for each seat. The in-vehicle camera 12 acquires image information by capturing an image of the vehicle cabin (occupants), and outputs this image information to the computing section 14.

The computing section 14 includes a processor such as a CPU. The computing section 14 realizes various functions by executing programs stored in the recording section 16. In the first embodiment, the computing section 14 functions as a recognizing section 20, an event predicting section 22, an identifying section 24, a frequency setting section 26, and an emotion estimating section 28. The recognizing section 20 recognizes a situation (position of an occupant, face of an occupant, or the like) in the vehicle, based on the image information acquired by the in-vehicle camera 12. The event predicting section 22 predicts the occurrence of an event based on the detection of prediction information 32. The identifying section 24 identifies a person and another person who is accompanying the person. The frequency setting section 26 sets the frequency with which the emotion estimation is performed. The emotion estimating section 28 performs the emotion estimation on the person based on the image information acquired by the in-vehicle camera 12. For example, the emotion estimating section 28 performs the emotion estimation by judging subtle expressions. At this time, the emotion estimating section 28 performs the emotion estimation with the frequency set by the frequency setting section 26.

The recording section 16 includes a storage apparatus such as a ROM, a RAM, or the like. The recording section 16 records the programs to be executed by the computing section 14, various numerical values, and the frequency of the emotion estimation (a prescribed frequency, a first frequency, and a second frequency), and also records event information 30 and prediction information 32 in association with each other and a person database 34 (also referred to below as a person DB 34). The event information 30 is information defining an event. Furthermore, the prediction information 32 is information for predicting the occurrence of an event indicated by the event information 30, i.e. information defining a preceding event. In the first embodiment, the event information 30 is information defining the event of a conversation between the person and the other person, and the prediction information 32 is information defining the preceding event of the face of the person or the line of sight of the person turning in the direction of the other person. The person DB 34 includes person information 36, other person information 38, and accompaniment history information 40. The person information 36 is biometric information of a person who is the target of the emotion estimation, and includes face image data, fingerprint data, and the like, for example. The other person information 38 is information linked to the person information 36, namely biometric information of other people who have a relationship with the person recorded in the person information 36, and includes face image data, fingerprint data, and the like, for example. The accompaniment history information 40 is data indicating, in time series, dates on which the person and the other person were together.

[1.2. Operation]

Figure 2:
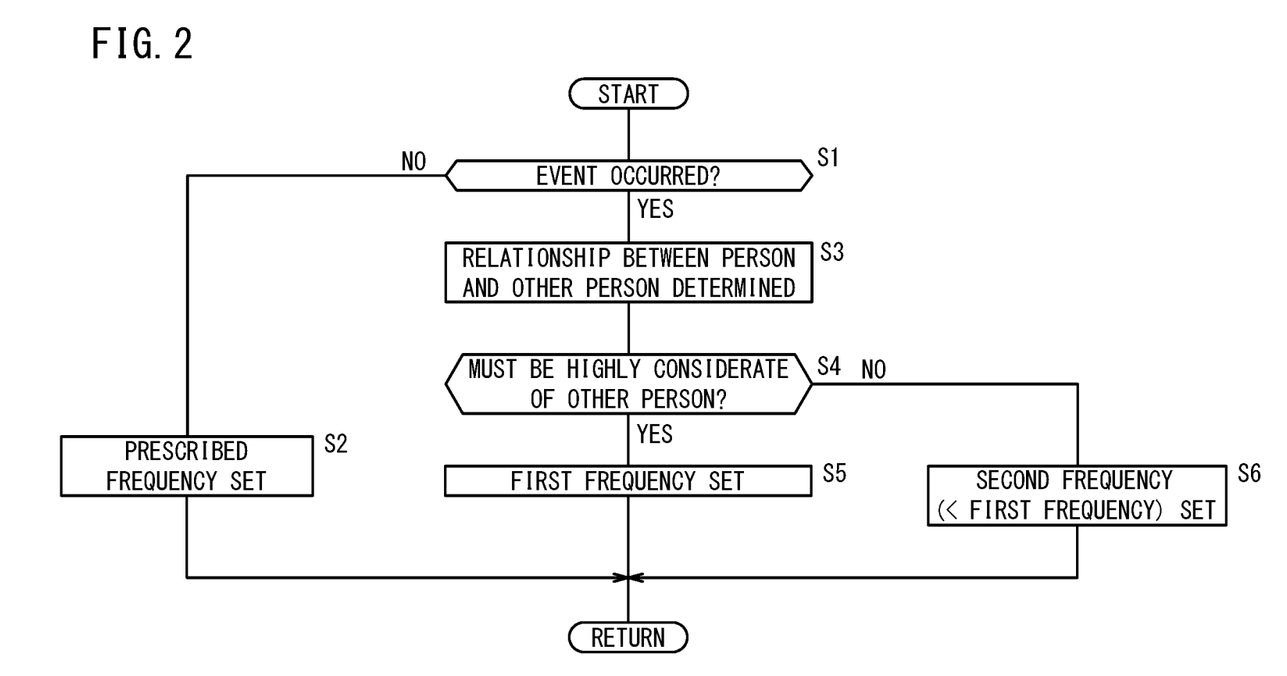
FIG. 2 is a process flow performed by the first embodiment and a second embodiment.

The following describes the operation of the emotion estimation apparatus 10 according to the first embodiment using FIG. 2. The series of processes shown in FIG. 2 are performed periodically.

At step S1, the event predicting section 22 monitors the detection situation of the preceding event defined by the prediction information 32, and predicts whether an event will occur. In this process, the in-vehicle camera 12 outputs the image information obtained by capturing an image of the inside of the vehicle to the computing section 14. The recognizing section 20 recognizes the position of the person and the position of the other person within the vehicle by an image recognition process using the image information, and recognizes the orientation of the face of the person or the orientation of the line of sight of the person through a face detection technique or line of sight detection technique using the image information. The event predicting section 22 identifies the direction of the other person with respect to the person and the orientation of the face of the person or the line of sight of the person, based on the recognition results of the recognizing section 20. If the preceding event (turning of the face or the line of sight of the person in the direction of the other person) is detected, the event predicting section 22 predicts that the event (a conversation between the person and the other person) will occur (step S1: YES). In this case, the process moves to step S3. On the other hand, if the preceding event is not detected, the event predicting section 22 predicts that the event will not occur (step S1: NO). In this case, the process moves to step S2.

When the process moves from step S1 to step S2, the frequency setting section 26 sets the prescribed frequency as the frequency for the emotion estimation. At this time, the computing section 14 outputs operational instructions to the emotion estimation apparatus (not shown in the drawings) to perform the emotion estimation with the prescribed frequency. After step S2, the series of processes is temporarily finished.

When the process moves from step S1 to step S3, the frequency setting section 26 determines the relationship between the person and the other person, based on the identification results of the identifying section 24. The identifying section 24 identifies the person by cross-referencing the image data of the face of the person recognized by the recognizing section 20 with face image data of the person information 36 in the person DB 34. Furthermore, the identifying section 24 identifies the other person by cross-referencing the image data of the face of the other person recognized by the recognizing section 20 with face image data of the other person information 38 linked to the person information 36 of the identified person. Yet further, the frequency setting section 26 identifies the accompaniment history information 40 linked to the other person information 38 and the person information 36 based on the identification result of the identifying section 24, and determines the relationship between the person and the other person. For example, the frequency setting section 26 calculates the number of times these people have accompanied each other, based on the accompaniment history information 40. Then, if the number of accompaniments is greater than a count threshold, the frequency setting section 26 determines that these people have a close relationship. Furthermore, if the number of accompaniments is less than or equal to the count threshold, the frequency setting section 26 determines that these people do not have a close relationship. If the identifying section 24 cannot identify the other person, the frequency setting section 26 determines that these people do not have a close relationship. Instead, the frequency setting section 26 may determine the relationship between these people according to the number of accompaniments within a prescribed time period. After step S3, the process moves to step S4.

At step S4, the frequency setting section 26 determines whether the other person is someone the person is highly considerate of. If these people do not have a close relationship, the frequency setting section 26 determines that the other person is someone the person needs to be highly considerate of (step S4: YES). In this case, the process moves to step S5. On the other hand, if these people have a close relationship, the frequency setting section 26 determines that the other person is not someone that the person needs to be highly considerate of (step S4: NO). In this case, the process moves to step S6.

When the process moves from step S4 to step S5, the frequency setting section 26 sets the frequency of the emotion estimation to be the first frequency, which is higher than the prescribed frequency. At this time, the computing section 14 outputs operational instructions to the emotion estimation apparatus (not shown in the drawings) to perform the emotion estimation with the first frequency. After step S5, the series of processes is temporarily finished.

When the process moves from step S4 to step S6, the frequency setting section 26 sets the frequency of the emotion estimation to be the second frequency, which is higher than the prescribed frequency and lower than the first frequency. At this time, the computing section 14 outputs operational instructions to the emotion estimation apparatus (not shown in the drawings) to perform the emotion estimation with the second frequency. After step S6, the series of processes is temporarily finished.

As shown in step S4, step S5, and step S6, the frequency setting section 26 sets the frequency based on the "event content" (whether the conversation is between people having a close relationship) of the event that is a conversation between the person and the other person.

The computing section 14 updates the accompaniment history information 40 linked to the other person information 38 and the person information 36. At this time, the computing section 14 newly registers, as the accompaniment history information 40, a system date at the time when the person and the other person are identified. However, in a case where information for a date that is the same as the system date is already recorded in the accompaniment history information 40, the computing section 14 does not update the accompaniment history information 40.

[1.3. Modification of the First Embodiment]

In the above description, it is imagined that the emotion estimation apparatus 10 is provided in a vehicle. Instead, the emotion estimation apparatus 10 according to the first embodiment may be provided in a moving body other than a vehicle. Furthermore, instead of a moving body, the emotion estimation apparatus 10 according to the first embodiment may be provided in a personal computer (including a mobile PC and tablet PC) or a smartphone, for example.

2. Second Embodiment

The following describes the emotion estimation apparatus 10 according to a second embodiment. In the second embodiment, the person and the other person getting into the vehicle is imagined as an event that causes a change in the emotion of a person.

[2.1. Configuration]

Figure 3:
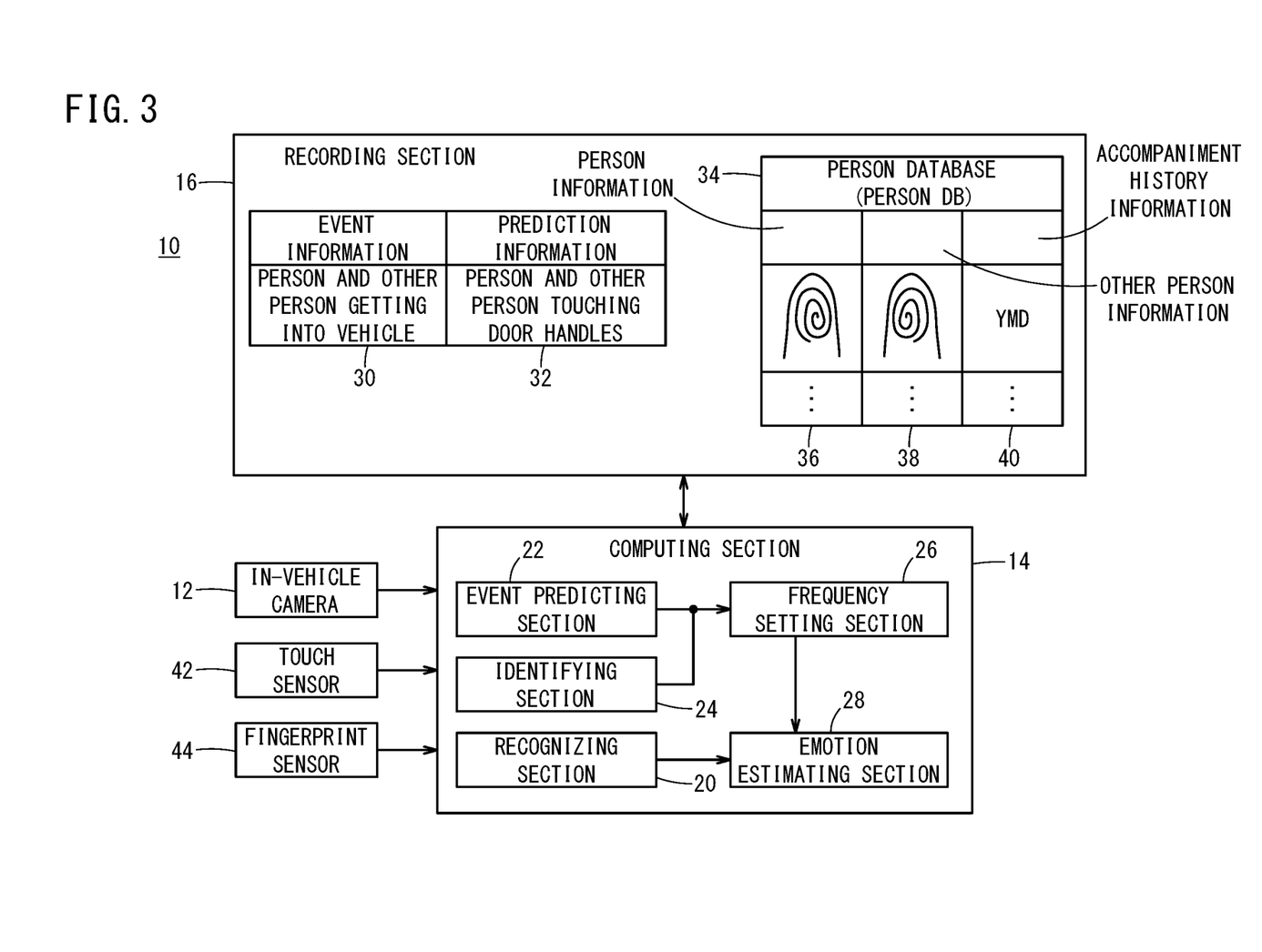
FIG. 3 is a block diagram of an emotion estimation apparatus according to the second embodiment.

The following describes the configuration of the emotion estimation apparatus 10 according to the second embodiment using FIG. 3. In the second embodiment, configurations that are the same as in the first embodiment are given the same reference numerals, and descriptions thereof are omitted. The emotion estimation apparatus 10 includes the in-vehicle camera 12, touch sensors 42, fingerprint sensors 44, the computing section 14, and the recording section 16.

The touch sensors 42 and the fingerprint sensors 44 are provided in respective door handles. The touch sensor 42 detects contact with the door handles and outputs detection information to the computing section 14. The fingerprint sensor 44 detects the fingerprint of the person or the other person who has touched the door handle and outputs fingerprint information to the computing section 14.

In the second embodiment, the computing section 14 functions as the recognizing section 20, the event predicting section 22, the identifying section 24, and the frequency setting section 26.

In the second embodiment, the recording section 16 records the event information 30 and the prediction information 32 in association with each other, and also records the person DB 34. In the second embodiment, the event information 30 is information defining the event of the person and the other person getting into the vehicle, and the prediction information 32 is information defining the preceding event of the person and the other person touching the door handles.

[2.2. Operation]

In the same manner as in the first embodiment, the following describes the operation of the emotion estimation apparatus 10 according to the second embodiment using FIG. 2. The series of processes shown in FIG. 2 is performed periodically. In the following, the processes performed in the second embodiment are described while focusing on steps (step S1 and step S3) in which the processes different from those in the first embodiment are performed.

At step S1, the event predicting section 22 monitors the detection situation of the preceding event defined by the prediction information 32, and predicts whether the event will occur. In this process, the event predicting section 22 identifies a contact state with the door handle, based on the detection results of the touch sensor 42 provided in the driver's side door and the touch sensor 42 provided in another door, e.g. the passenger side door. If the preceding event (the person and the other person touching the door handles) is detected, the event predicting section 22 predicts that the event (the person and the other person getting into the vehicle) will occur (step S1: YES). In this case, the process moves to step S3. On the other hand, if the preceding event is not detected, the event predicting section 22 predicts that the event will not occur (step S1: NO). In this case, the process moves to step S2.

When the process moves from step S1 to step S3, the frequency setting section 26 determines the relationship between the person and the other person, based on the identification result of the identifying section 24. The identifying section 24 identifies the person by cross-referencing the fingerprint data detected by the fingerprint sensor 44 provided in the driver side door with the fingerprint data of the person information 36 in the person DB 34. Furthermore, the identifying section 24 identifies the other person by cross-referencing the fingerprint data detected by the fingerprint sensor 44 provided in the passenger side door with the fingerprint data of the other person information 38 linked to the person information 36 of the identified person. Yet further, the frequency setting section 26 determines the relationship between the person and the other person by identifying the accompaniment history information 40 linked to the other person information 38 and the person information 36, based on the identification results of the identifying section 24. The method for determining the relationship between the person and the other person can be the same as in the first embodiment.

In the same manner as in the first embodiment, the frequency setting section 26 sets the frequency based on the "event content" (getting into the vehicle with someone the person has a close relationship with) of the event that is the person getting into the vehicle.

[2.3. Modification of the Second Embodiment]

The second embodiment may be combined with the first embodiment.

3. Third Embodiment

The following describes the emotion estimation apparatus 10 according to a third embodiment. In the third embodiment, a change in the driving situation is imagined as an event that causes a change in the emotion of a person.

[3.1. Configuration]

Figure 4:
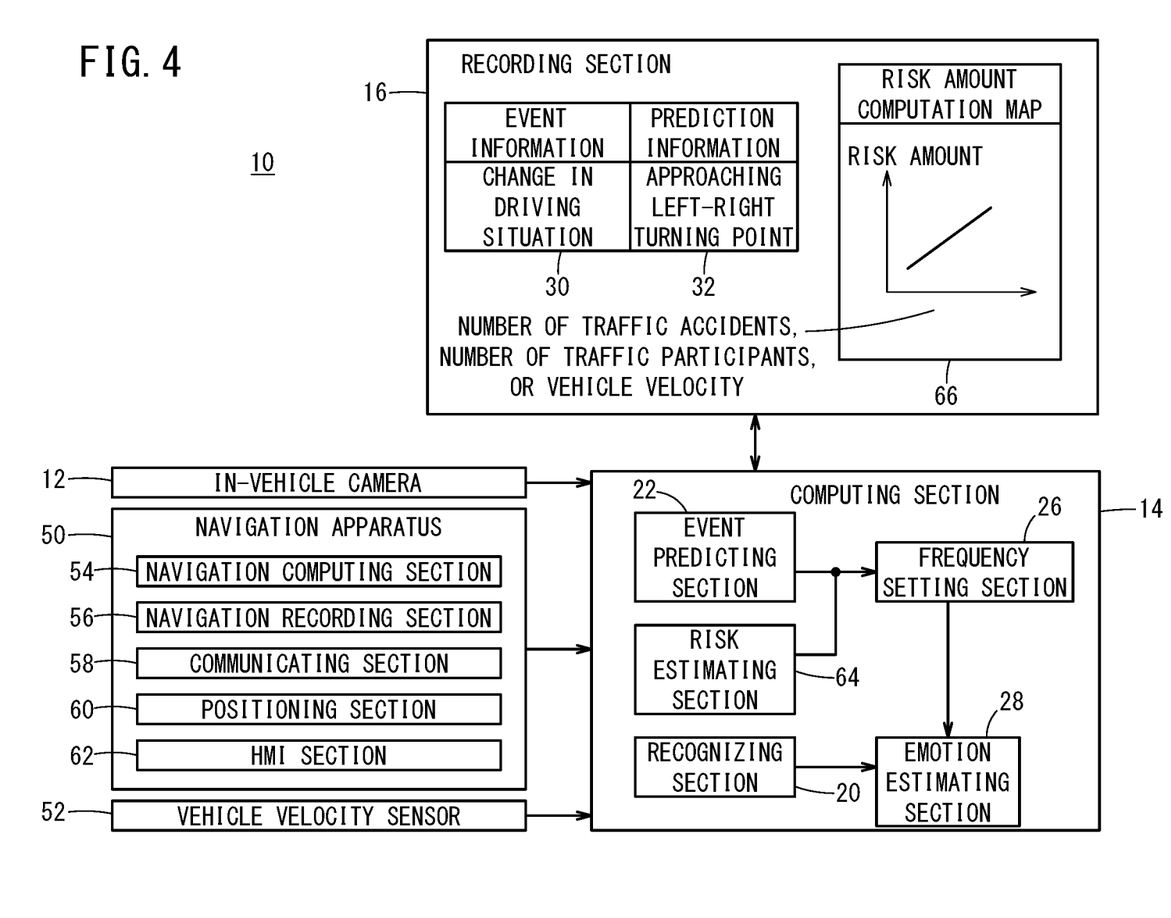
FIG. 4 is a block diagram of an emotion estimation apparatus according to a third embodiment.

The following describes the configuration of the emotion estimation apparatus 10 according to the third embodiment using FIG. 4. In the third embodiment, configurations that are the same as in the first embodiment are given the same reference numerals, and descriptions thereof are omitted. The emotion estimation apparatus 10 includes the in-vehicle camera 12, a navigation apparatus 50, a velocity sensor 52, the computing section 14, and the recording section 16.

The navigation apparatus 50 includes a navigation computing section 54, a navigation recording section 56, a communicating section 58, a positioning section 60, and an HMI section 62. The navigation computing section 54 includes a processor such as a CPU. The navigation recording section 56 includes a storage apparatus such as a ROM and RAM, and records map information. The communicating section 58 includes a first receiver that receives radio waves transmitted from a communication terminal provided on the road, and a second receiver that receives radio waves transmitted from a broadcast station. The positioning section 60 includes a gyro sensor and a GPS receiver that receives radio waves transmitted from a GPS satellite. The navigation apparatus 50 outputs, to the computing section 14, information such as traffic information received by the respective receivers and the vehicle position determined by the GPS receiver or the like. The velocity sensor 52 detects the travel velocity of the vehicle and outputs this travel velocity to the computing section 14.

In the third embodiment, the computing section 14 functions as the recognizing section 20, the event predicting section 22, a risk estimating section 64, and the frequency setting section 26. The risk estimating section 64 estimates the amount of risk for the driving situation of the vehicle in which the person is riding.

In the third embodiment, the recording section 16 records the event information 30 and the prediction information 32 in association with each other, and also records a risk amount computation map 66. In the third embodiment, the event information 30 is information defining the event of a change in the driving situation, and the prediction information 32 is information defining the preceding event of approaching a left-right turning point. Here, "approaching" refers to the distance between the vehicle position and the left-right turning point becoming less than or equal to a prescribed distance. The risk amount computation map 66 associates, in advance, a risk parameter (the number of traffic accidents, the number of traffic participants, the vehicle velocity, or the like) with the risk amount. Here, the "risk amount" refers to the amount of the travel risk at the left-right turning point or following the left-right turning point. In the following description, the risk amount is the amount of the travel risk at the left-right turning point.

[3.2. Operation]

Figure 5:
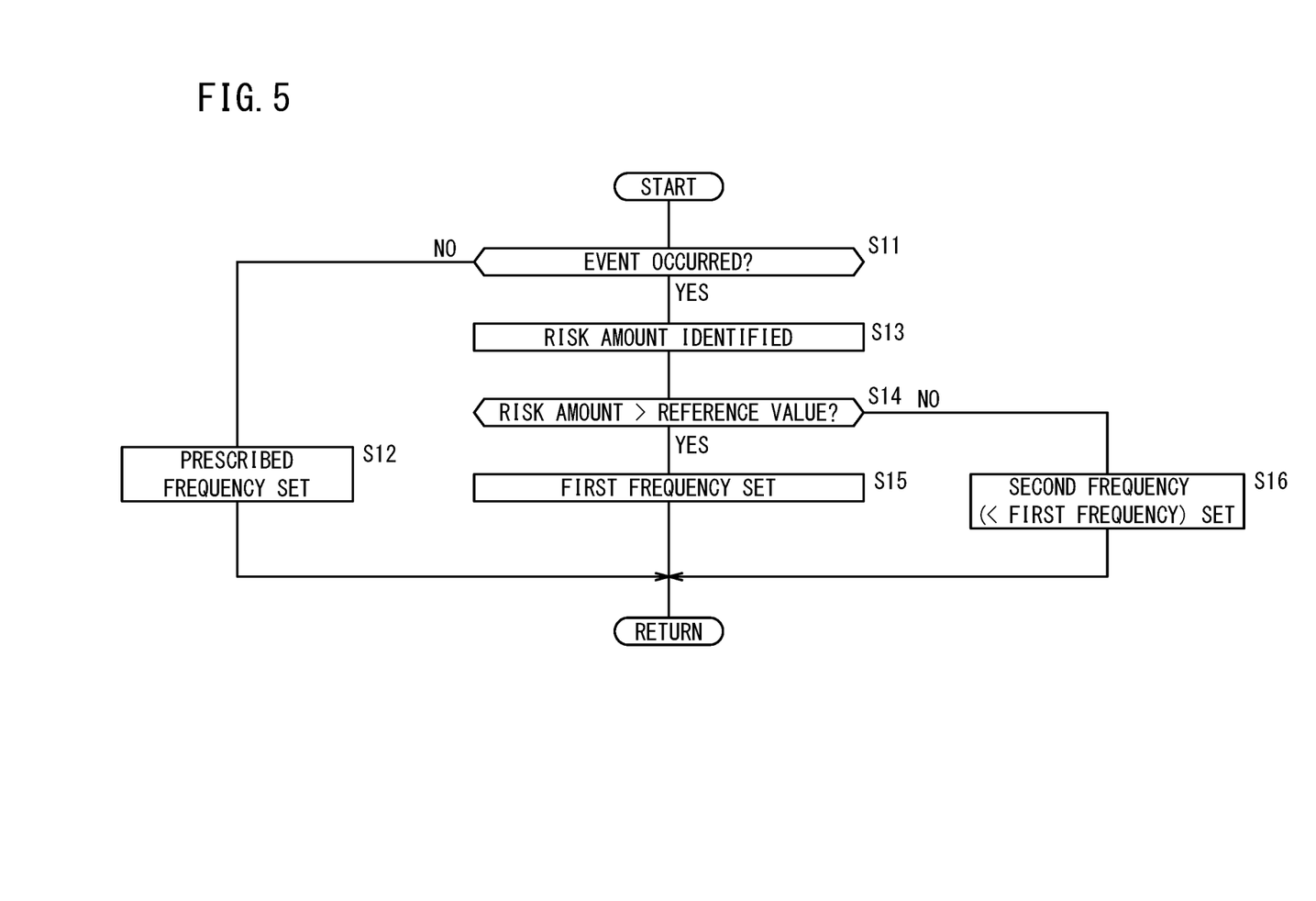
FIG. 5 is a process flow performed by the third embodiment.

The following describes the operation of the emotion estimation apparatus 10 according to the third embodiment using FIG. 5. The series of processes shown in FIG. 5 are performed periodically. Among the processes shown in FIG. 5, the processes of step S12, step S15, and step S16 are the same as the processes of step S2, step S5, and step S6 shown in FIG. 2. The following describes the processes performed in the third embodiment while focusing on the processes of step S11, step S13, and step S14, at which original processes are performed.

At step S11, the event predicting section 22 monitors the detection situation of the preceding event defined by the prediction information 32, and predicts whether the event will occur. In this process, the navigation apparatus 50 measures the newest vehicle position and monitors the planned travel path set within a prescribed distance from the vehicle position. The prescribed distance is recorded in advance in the navigation recording section 56. When a left-right turning point present within a prescribed distance from the vehicle position is detected, the navigation apparatus 50 outputs, to the computing section 14, a detection signal indicating that a left-right turning point is within the prescribed distance. If the preceding event (approaching a left-right turning point) is detected by the navigation apparatus 50, the event predicting section 22 predicts that the event (change in the driving situation) will occur (step S11: YES). In this case, the process moves to step S13. On the other hand, if the preceding event is not detected by the navigation apparatus 50, the event predicting section 22 predicts that the event will not occur (step S11: NO). In this case, the process moves to step S12.

When the process moves from step S11 to step S13, the frequency setting section 26 identifies the risk amount based on the estimation result of the risk estimating section 64. In this process, the navigation apparatus 50 acquires, from the broadcast station or an external communication terminal via the communicating section 58, traffic information, e.g. information concerning the number of traffic participants or the number of traffic accidents, for the road containing the left-right turning point, and outputs this information to the computing section 14. Furthermore, the velocity sensor 52 outputs the detected vehicle velocity to the computing section 14. The risk estimating section 64 estimates the risk amount corresponding to at least one of the risk parameters (the number of traffic participants, the number of traffic accidents, and the vehicle velocity) using the risk amount computation map 66. The frequency setting section 26 identifies the risk amount estimated by the risk estimating section 64 as the risk amount of the road containing the left-right turning point.

At step S14, the frequency setting section 26 compares the risk amount to a reference value. Information concerning the reference value is recorded in advance in the recording section 16. If the risk amount is greater than the reference value (step S14: YES), the process moves to step S15. On the other hand, if the risk amount is less than or equal to the reference value (step S14: NO), the process moves to step S16.

As shown in step S14, step S15, and step S16, the frequency setting section 26 sets the frequency based on the "event content" (whether the change in the driving situation causes the risk amount to become higher than the reference value) of the event that is a change in the driving situation.

[3.3. Modifications of the Third Embodiment]

[3.3.1. First Modification]

The third embodiment may be combined with at least one of the first embodiment and the second embodiment.

[3.3.2. Second Modification]

The recording section 16 may record in advance a map in which the risk amount and the frequency are associated. The map associates higher frequencies with higher risk amounts. In this case, the frequency setting section 26 obtains the frequency corresponding to the risk amount from the map.

4. Fourth Embodiment

The following describes the emotion estimation apparatus 10 according to a fourth embodiment. In the fourth embodiment, notification of guidance to a shop being provided to a person riding in the vehicle (notification of information) is imagined as an event that causes a change in the emotion of a person.

[4.1. Configuration]

Figure 6:
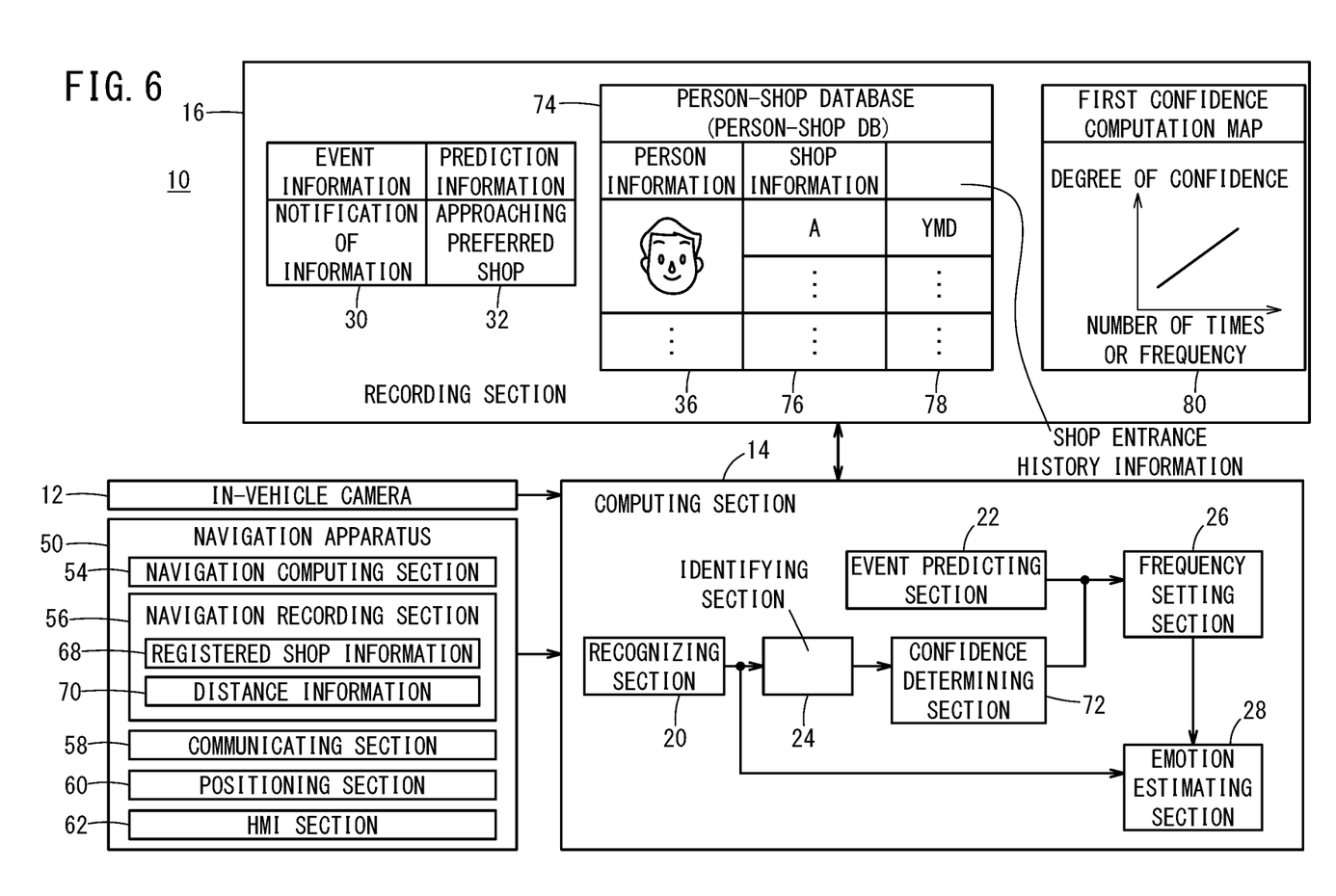
FIG. 6 is a block diagram of an emotion estimation apparatus according to a fourth embodiment.

The following describes the configuration of the emotion estimation apparatus 10 according to the fourth embodiment using FIG. 6. In the fourth embodiment, configurations that are the same as in the first embodiment are given the same reference numerals, and descriptions thereof are omitted. The emotion estimation apparatus 10 includes the in-vehicle camera 12, the navigation apparatus 50, the computing section 14, and the recording section 16.

The navigation recording section 56 of the navigation apparatus 50 records registered shop information 68 and distance information 70 (a first distance and a second distance). The registered shop information 68 is information concerning a shop registered by the person, e.g. information of a preferred shop (a shop in line with the person's preferences), and includes the name of the shop and position information. The first distance in the distance information 70 is information defining the timing at which notification of guidance to the shop is provided. The second distance in the distance information 70 is information defining the timing at which a prediction of this notification is performed. The first distance is less than the second distance. In the present embodiment, if the distance between the vehicle position measured by the positioning section 60 and the position of the shop registered as the registered shop information 68 is less than or equal to the second distance, the navigation apparatus 50 outputs a detection signal indicating that a preferred shop is nearby, and if the above distance is less than or equal to the first distance, the navigation apparatus 50 provides notification indicating that the vehicle is near the shop, via the HMI section 62.

In the fourth embodiment, the computing section 14 functions as the event predicting section 22, the recognizing section 20, the identifying section 24, a confidence determining section 72, and the frequency setting section 26. The confidence determining section 72 determines the degree of confidence of the notification content provided by the HMI section 62 of the navigation apparatus 50.

In the fourth embodiment, the recording section 16 records the event information 30 and the prediction information 32 in association with each other, and also records a person-shop database 74 (also referred to below as a person-shop DB 74) and a first confidence computation map 80. In the fourth embodiment, the event information 30 is information defining the event of information (shop guidance) notification, and the prediction information 32 is information defining the preceding event of approaching a preferred shop. The person-shop DB 74 includes the person information 36, shop information 76, and shop entrance history information 78. The shop information 76 is information linked to the person information 36, and includes information concerning the names of shops, types of shops, positions of shops, and the like visited in the past by the person registered in the person information 36. The shop entrance history information 78 is information linked to the shop information 76 and the person information 36, and is data indicating, in time series, the dates that the person visited the shops. The first confidence computation map 80 associates in advance a degree of confidence parameter (the number of entrances to the shop, the shop entrance frequency, or the like) and a degree of confidence. Here, "degree of confidence" is a measure of whether or not the notification content is appropriate.

[4.2. Operation]

Figure 7:
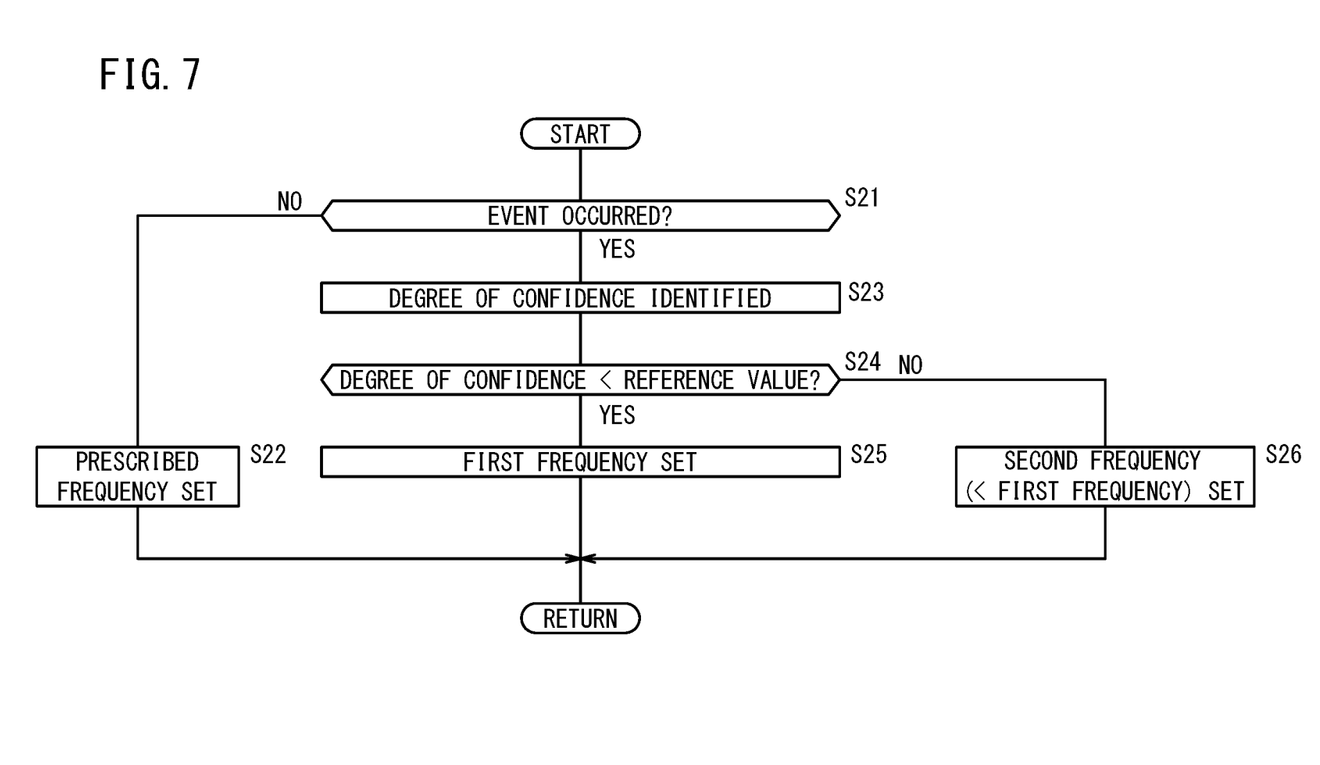
FIG. 7 is a process flow performed by the fourth embodiment and a fifth embodiment.

The following describes the operation of the emotion estimation apparatus 10 according to the fourth embodiment using FIG. 7. The series of processes shown in FIG. 7 are performed periodically. Among the processes shown in FIG. 7, the processes of step S22, step S25, and step S26 are the same as the processes of step S2, step S5, and step S6 shown in FIG. 2. The following describes the processes performed in the fourth embodiment while focusing on the processes of step S21, step S23, and step S24, at which original processes are performed.

At step S21, the event predicting section 22 monitors the detection situation of the preceding event defined by the prediction information 32, and predicts whether the event will occur. In this process, the navigation apparatus 50 measures the newest vehicle position and monitors the relative position of the vehicle to the shop registered in the registered shop information 68. If the distance between the vehicle and the shop is less than or equal to the second distance (which is greater than the first distance), the navigation apparatus 50 outputs, to the computing section 14, a detection signal indicating that the registered shop is within the second distance, i.e. that a preferred shop is nearby. If the preceding event (approaching a preferred shop) is detected by the navigation apparatus 50, the event predicting section 22 predicts that the event (notification of information) will occur (step S21: YES). In this case, the process moves to step S23. On the other hand, if the preceding event is not detected by the navigation apparatus 50, the event predicting section 22 predicts that the event will not occur (step S21: NO). In this case, the process moves to step S22.

When the process moves from step S21 to step S23, the frequency setting section 26 identifies the degree of confidence based on the determination result of the confidence determining section 72. In this process, the navigation apparatus 50 outputs, to the computing section 14, the registered shop information 68 concerning the shop for which the distance from the vehicle has become less than or equal to the second distance. Furthermore, the in-vehicle camera 12 outputs, to the computing section 14, the image information obtained by capturing an image of the inside of the vehicle. The recognizing section 20 recognizes the face of the person in the vehicle through an image recognition process using the image information. The identifying section 24 identifies the person by cross-referencing the image data of the face of the person recognized by the recognizing section 20 with the face image data of the person information 36 in the person-shop DB 74. The confidence determining section 72 searches for shop information 76 matching the registered shop information 68, in the shop information 76 linked to the person information 36 of the identified person. Furthermore, the confidence determining section 72 calculates the number of entrances to the shop or the shop entrance frequency within a prescribed time period, based on the shop entrance history information 78 linked to the shop information 76 found in the search. The confidence determining section 72 determines the degree of confidence corresponding to at least one of the confidence parameters (the number of shop entrances and the shop entrance frequency) using the first confidence computation map 80. The frequency setting section 26 identifies the degree of confidence determined by the confidence determining section 72 as the degree of confidence of the notification information.

At step S24, the frequency setting section 26 compares the degree of confidence to a reference value. The information concerning the reference value is recorded in advance in the recording section 16. If the degree of confidence is less than the reference value (step S24: YES), the process moves to step S25. On the other hand, if the degree of confidence is greater than or equal to the reference value (step S24: NO), the process moves to step S26.

As shown in step S24, step S25, and step S26, the frequency setting section 26 sets the frequency based on the "event content" (whether the notification by the system has a high degree of confidence) of the event that is notification of information.

If the person has actually entered the shop, the computing section 14 updates the shop entrance history information 78 linked to the shop information 76 and the person information 36. In this case, the computing section 14 newly registers, as the shop entrance history information 78, a system date at the time when the vehicle has parked or departed from near the shop. The computing section 14 detects the parking or departure of the vehicle according to a manipulation of an ignition switch, starter switch, or the like.

[4.3. Modifications of the Fourth Embodiment]
[4.3.1. First Modification]

The fourth embodiment may be combined with at least one of the first embodiment to the third embodiment.

Furthermore, the frequency setting section 26 may set a unique frequency for each of "conversation between the person and the other person", "the person and the other person getting into the vehicle", "change in the driving situation", and "notification of information", which are different types of event content.

[4.3.2. Second Modification]

The recording section 16 may record in advance a map in which the degree of confidence and the frequency are associated. The map associates lower frequencies with higher degrees of confidence. In this case, the frequency setting section 26 obtains the frequency corresponding to the degree of confidence from the map.

5. Fifth Embodiment

The following describes the emotion estimation apparatus 10 according to a fifth embodiment. In the fifth embodiment, notification of a recommendation for refueling (recommended item) to a person riding in the vehicle (notification of information) is imagined as an event that causes a change in the emotion of a person. In the present embodiment, the vehicle is imagined to be a gasoline-powered vehicle or diesel-powered vehicle that uses gasoline, diesel oil, or the like as fuel.

[5.1. Configuration]

Figure 8:
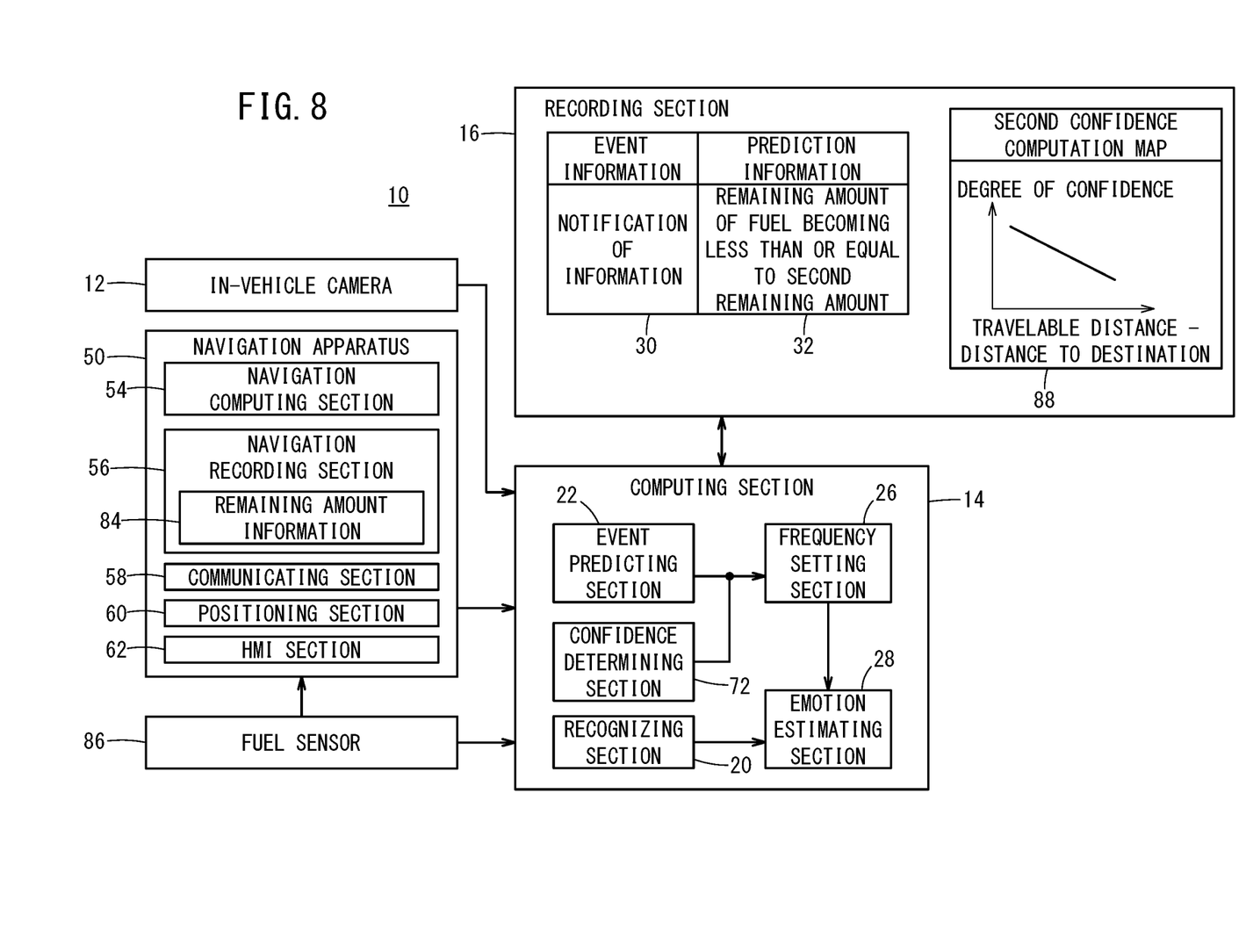
FIG. 8 is a block diagram of an emotion estimation apparatus according to the fifth embodiment.

The following describes the configuration of the emotion estimation apparatus 10 according to the fifth embodiment using FIG. 8. In the fifth embodiment, configurations that are the same as in the first embodiment are given the same reference numerals, and descriptions thereof are omitted. The emotion estimation apparatus 10 includes the in-vehicle camera 12, the navigation apparatus 50, a fuel sensor 86, the computing section 14, and the recording section 16.

The fuel sensor 86 is provided in a fuel tank of the vehicle. The fuel sensor 86 detects the remaining amount of fuel in the fuel tank, and outputs this remaining amount to the navigation apparatus 50 and the computing section 14.

The navigation recording section 56 of the navigation apparatus 50 records remaining amount information 84 (a first remaining amount and a second remaining amount). The first remaining amount in the remaining amount information 84 is information defining a timing for providing notification recommending refueling. The second remaining amount in the remaining amount information 84 is information defining a timing for predicting this notification. The first remaining amount is less than the second remaining amount. In the present embodiment, if the remaining amount of fuel detected by the fuel sensor 86 is less than or equal to the first remaining amount, the navigation apparatus 50 provides notification to the person in the vehicle that refueling is necessary, via the HMI section 62.

In the fifth embodiment, the computing section 14 functions as the recognizing section 20, the event predicting section 22, the confidence determining section 72, and the frequency setting section 26.

In the fifth embodiment, the recording section 16 records the event information 30 and the prediction information 32 in association with each other, and also records a second confidence computation map 88. In the fifth embodiment, the event information 30 is information defining the event of notification of information (refueling recommendation), and the prediction information 32 is information defining the preceding event of the remaining amount of fuel becoming less than or equal to the second remaining amount. The second confidence computation map 88 associates in advance a degree of confidence parameter (travelable distance–distance to destination) and a degree of confidence.

[5.2. Operation]

In the same manner as in the fourth embodiment, the following describes the operation of the emotion estimation apparatus 10 according to the fifth embodiment using FIG. 7. The series of processes shown in FIG. 7 are performed periodically. The following describes the processes performed in the fifth embodiment while focusing on the steps (step S21 and step S23) in which the processes different from those in the fourth embodiment are performed.

At step S21, the event predicting section 22 monitors the detection situation of the preceding event defined by the prediction information 32, and predicts whether the event will occur. In this process, the fuel sensor 86 detects the remaining amount of fuel and outputs this remaining amount to the navigation apparatus 50 and the computing section 14. If the remaining amount of fuel is less than or equal to the second remaining amount (which is greater than the first remaining amount), the navigation apparatus 50 outputs, to the computing section 14, a signal indicating that notification of a recommendation to refuel is to be provided. If the preceding event (the remaining amount of fuel becoming less than or equal to the second remaining amount) is detected by the navigation apparatus 50, the event predicting section 22 predicts that the event (notification of information) will occur (step S21: YES). In this case, the process moves to step S23. On the other hand, if the preceding event is not detected by the navigation apparatus 50, the event predicting section 22 predicts that the event will not occur (step S21: NO). In this case, the process moves to step S22.

When the process moves from step S21 to step S23, the frequency setting section 26 identifies the degree of confidence based on the determination result of the confidence determining section 72. In this process, the confidence determining section 72 calculates the longest distance that can be traveled without refueling, i.e. the travelable distance, based on the remaining amount of fuel detected by the fuel sensor 86 and the fuel consumption recorded in the recording section 16. Furthermore, the confidence determining section 72 acquires the distance from the vehicle position measured by the navigation apparatus 50 to the destination, and calculates the "travelable distance–distance to the destination". The confidence determining section 72 determines the degree of confidence corresponding to the "travelable distance–distance to the destination" using the second confidence computation map 88. The frequency setting section 26 identifies the degree of confidence determined by the confidence determining section 72 as the degree of confidence of the notification information.

In the same manner as in the fourth embodiment, the frequency setting section 26 sets the frequency based on the "event content" (whether the notification by the system has high degree of confidence) of the event that is the notification of information.

[5.3. Modifications of the Fifth Embodiment]

[5.3.1. First Modification]

The fifth embodiment may be combined with at least one of the first embodiment to the fourth embodiment.

[5.3.2. Second Modification]

The recording section 16 may record in advance a map in which the degree of confidence and the frequency are associated, and the frequency setting section 26 may obtain the frequency corresponding to the degree of confidence from the map. In this case, the map associates lower frequencies with higher degrees of confidence.

[5.3.3. Third Modification]

In the fifth embodiment, when the notification of information (refueling recommendation) is made, this notification may be accompanied by a question. For example, when recommending refueling to the person, the navigation apparatus 50 may ask (first question) whether to set a refueling location. In response to this question, the person answers yes or no using the HMI section 62. Furthermore, when recommending refueling to the person, the navigation apparatus 50 may ask (second question) about a desired refueling location. In response to this question, the person sets a refueling location using the HMI section 62.

The frequency setting section 26 sets the first frequency in the case of a question, such as the second question, which cannot be answered with yes or no, and sets the second frequency (which is less than the first frequency) in the case of a question, such as the first question, which can be answered with yes or no.

In the third modification, the frequency setting section 26 sets the frequency based on the "event content" (whether the notification of the information can be answered with yes or no) of the event of notification of information.

6. Other Embodiments

The frequency with which the emotion estimation is performed may be changed at other timings. For example, the preceding event of a phone call or mail reaching a mobile terminal of the person may be set as the preceding event for the event of the person talking on his or her mobile telephone or reading a message that reached the mobile terminal of the person. In this case, the frequency of the emotion estimation is set to be higher than the normal frequency in response to a phone call or mail reaching the mobile terminal of the person.

7. Inventions that can be Obtained from the Embodiments

The following is a record of the inventions that can be understood from the embodiments and modifications described above.

The present invention comprises: the recording section 16 configured to record the prediction information 32 for, for each event that causes a change in the emotion of the person, predicting the occurrence of an event; the event predicting section 22 configured to predict the occurrence of the event, based on detection of the prediction information 32; and the frequency setting section 26 configured to set the frequency with which the estimation of the emotion is performed, wherein if the occurrence of the event is predicted by the event predicting section 22, the frequency setting section 26 sets the frequency to be higher than in a case where the occurrence of the event is not predicted, and also sets the frequency based on the content of the event.

According to the above configuration, when the occurrence of an event causing a change in the emotion of the person is predicted, the frequency is set to be higher than in a case where the occurrence of the event is not predicted, and therefore it is possible to appropriately comprehend the emotion of the person. Furthermore, since the frequency is set based on the event content, it is possible to stop the emotion estimation from being performed with a needlessly high frequency, and to therefore restrict an increase in the computational load of the apparatus. Yet further, since the emotion estimation is performed with the normal frequency when the occurrence of the event is not predicted, the computational load of the emotion estimation apparatus 10 is restricted from becoming large.

The present invention (first embodiment) may comprise: the identifying section 24 configured to identify the other person accompanying the person, wherein the recording section 16 may record the prediction information 32 for predicting the occurrence of a conversation between the person and the other person, and the frequency setting section 26 may set the frequency based on a result of identification of the other person by the identifying section 24.

According to the above configuration, it is possible to predict the event that causes a change in the emotion of the person, which is the conversation between the person and the other person. At this time, since the frequency is set based on the relationship between the person and the other person, it is possible to perform the emotion estimation with a suitable frequency.

The present invention (second embodiment) may comprise: the identifying section 24 configured to identify the other person accompanying the person, wherein the recording section 16 may record the prediction information 32 for predicting whether the person will get into the vehicle, and the frequency setting section 26 may set the frequency based on a result of identification of the other person by the identifying section 24.

According to the above configuration, it is possible to predict the event that causes a change in the emotion of the person, which is the person and the other person getting into the vehicle. At this time, since the frequency is set based on the relationship between the person and the other person, it is possible to perform the emotion estimation with a suitable frequency.

In the present invention (first and second embodiments), the recording section 16 may record, for each of a plurality of the other persons, a result of determination as to whether the person is highly considerate of the other person, and the frequency setting section 26 may set the first frequency if the person is highly considerate of the other person (step S5 of FIG. 2), and may set the second frequency, which is lower than the first frequency, if the person is not highly considerate of the other person (step S6 of FIG. 2).

The present invention (third embodiment) may comprise: the risk estimating section 64 configured to estimate the risk amount for the driving situation of the vehicle in which the person is riding, wherein the recording section 16 may record the prediction information 32 for predicting a change in the driving situation of the vehicle, and the frequency setting section 26 may set the frequency based on the risk amount at a change location or after the change in the driving situation of the vehicle estimated by the risk estimating section 64.

According to the above configuration, it is possible to predict the event that causes a change in the emotion of the person, which is a change in the driving situation. At this time, since the frequency is set based on the risk amount, it is possible to perform the emotion estimation with a suitable frequency.

In the present invention (third embodiment), the frequency setting section 26 may set the frequency to be higher as the risk amount is greater.

For example, the frequency setting section 26 may set the first frequency if the risk amount is higher than a prescribed reference value (step S15 of FIG. 5), and may set the second frequency, which is lower than the first frequency, if the risk amount is less than or equal to the reference value (step S16 of FIG. 5).

In the present invention (third embodiment), the risk estimating section 64 may estimate the risk amount based on at least one of the number of traffic accidents, the vehicle velocity, and the number of traffic participants.

The present invention (fourth and fifth embodiments) may comprise: a notifying section (HMI section 62) configured to provide notification of prescribed information to the person; and the confidence determining section 72 configured to determine the degree of confidence of the content of the notification provided by the notifying section, wherein the recording section 16 may record the prediction information 32 for predicting provision of notification of the prescribed information, and the frequency setting section 26 may set the frequency based on the degree of confidence determined by the confidence determining section 72.

According to the above configuration, it is possible to predict the event that causes a change in the emotion of the person, which is notifying the person about information. At this time, since the frequency is set based on the degree of confidence, it is possible to perform the emotion estimation with a suitable frequency.

In the present invention (fourth and fifth embodiments), the frequency setting section 26 may set the frequency to be higher as the degree of confidence is lower.

For example, the frequency setting section 26 may set the first frequency if the degree of confidence is lower than a prescribed reference value (step S25 of FIG. 7), and may set the second frequency, which is lower than the first frequency, if the degree of confidence is greater than the reference value (step S26 of FIG. 7).

In the present invention (fourth embodiment), the confidence determining section 72 may determine the degree of confidence according to whether the content of the notification is in line with a preference of the person.

In the present invention (second modification of the fifth embodiment), the content of the notification to the person may accompany a question to the person, and the frequency setting section 26 may set the first frequency if the question is not a yes or no question, and set the second frequency, which is lower than the first frequency, if the question is a yes or no question.

The emotion estimation apparatus of the present invention is not limited to the above described embodiments, and various configurations can be adopted without deviating from the scope of the present invention.

What is claimed is:

1. An emotion estimation apparatus comprising:
a recording section configured to record event information and prediction information in association with each other, for each event that causes a change in at least one of an emotion of a person, and driving situation, predicting an occurrence of the event, and also to record a risk amount computation map which associates in advance, a risk parameter with a risk amount;
an event predicting section configured to predict the occurrence of the event, based on detection of the prediction information; and
a risk estimating section configured to estimate a risk amount for a driving situation of a vehicle in which the person is riding,
a frequency setting section configured to set a frequency indicating at least one of a number of times that an estimation of the emotion is performed within a certain period of time, and, the risk amount from the risk estimating section,
wherein the frequency setting section sets the frequency based on the risk amount in the driving situation of the vehicle estimated by the risk estimating section, and
wherein if the occurrence of the event is predicted by the event predicting section, the frequency setting section sets the frequency to be higher than in a case where the occurrence of the event is not predicted, and also sets the frequency based on content of the event.

2. The emotion estimation apparatus according to claim 1, further comprising:
an identifying section configured to identify another person accompanying the person,
wherein the recording section records the prediction information for predicting an occurrence of a conversation between the person and the other person, and the frequency setting section sets the frequency based on a result of identification of the other person by the identifying section.

3. The emotion estimation apparatus according to claim 1, further comprising:
an identifying section configured to identify another person accompanying the person,
wherein the recording section records the prediction information for predicting whether the person will get into a vehicle, and the frequency setting section sets the frequency based on a result of identification of the other person by the identifying section.

4. The emotion estimation apparatus according to claim 2, wherein the recording section records, for each of a plurality of the other persons, a result of determination as to whether the person is highly considerate of the other person, and the frequency setting section sets a first frequency if the person is highly considerate of the other person, and sets a second frequency, which is lower than the first frequency, if the person is not highly considerate of the other person.

5. The emotion estimation apparatus according to claim 1, wherein the frequency setting section sets the frequency to be higher as the risk amount is greater.

6. The emotion estimation apparatus according to claim 5, wherein the risk estimating section estimates the risk amount using the risk amount computation map, based on at least one risk parameter selected from a number of traffic accidents, vehicle velocity, and a number of traffic participants.

7. The emotion estimation apparatus according to claim 1, wherein the recording section records event information defining an event that causes a change in the emotion of the person, and the prediction information for predicting an occurrence of the event, in association with each other, and the event predicting section predicts, based on detection of the prediction information, and the occurrence of the event defined by the event information in association with each other.

* * * * *